Jan. 12, 1971  E. S. WOODHALL  3,553,778
TIRE MOLDING APPARATUS
Filed July 1, 1968  6 Sheets-Sheet 1

INVENTOR
EDWIN S.
WOODHALL

AGENT

INVENTOR.
EDWIN S. WOODHALL
BY
AGENT

INVENTOR.
EDWIN S. WOODHALL
BY
R. S. Washburn
AGENT

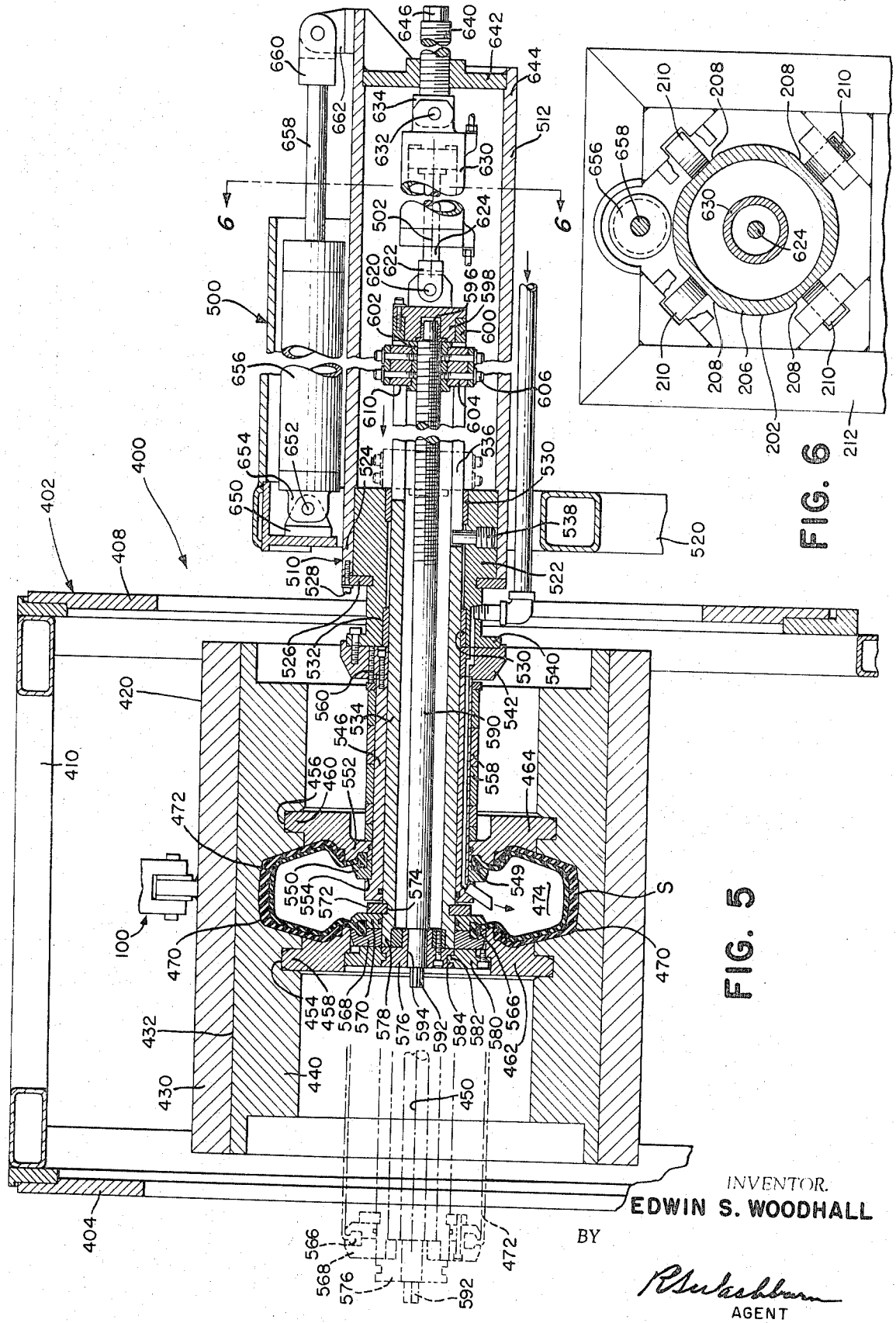

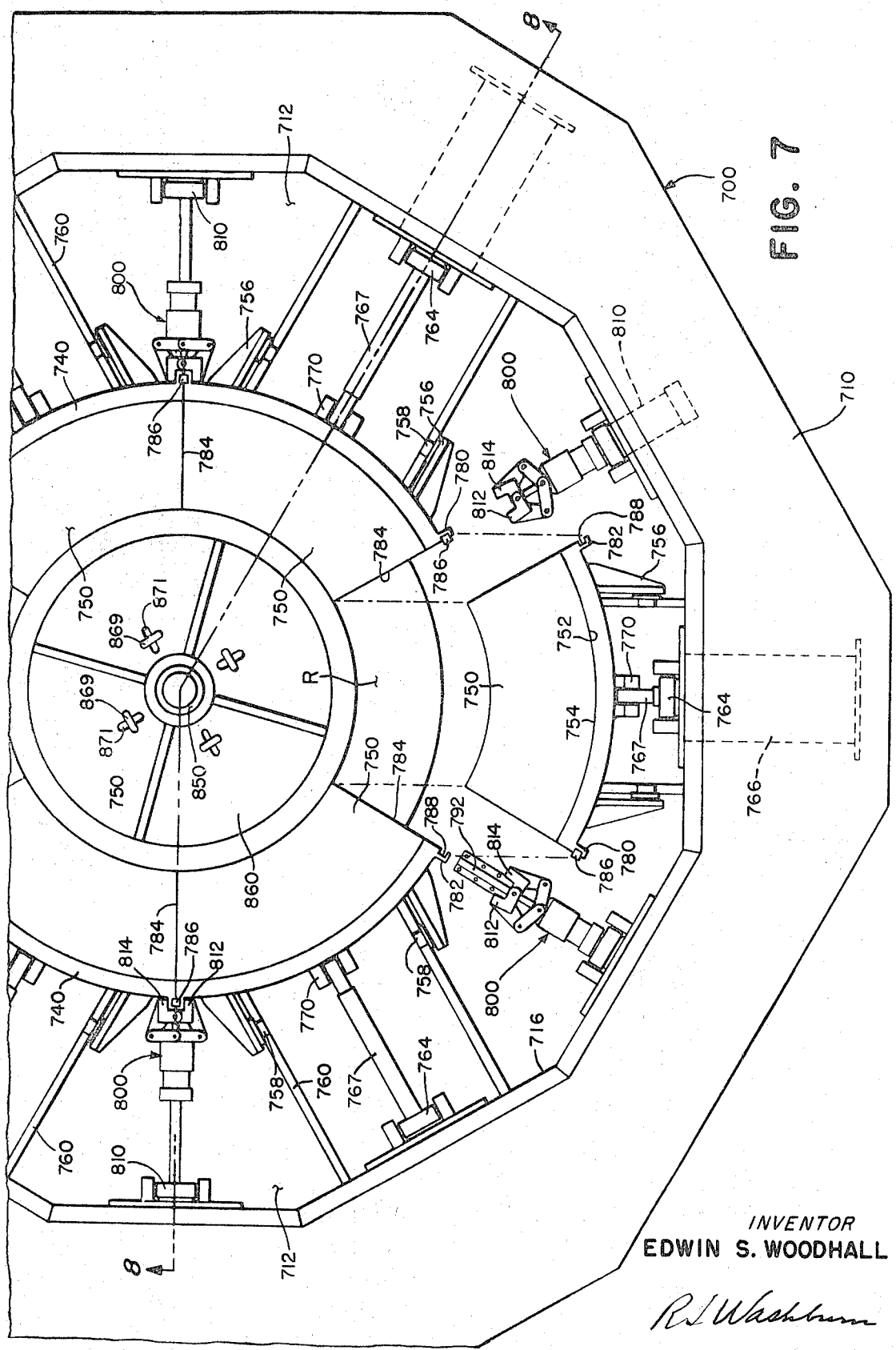

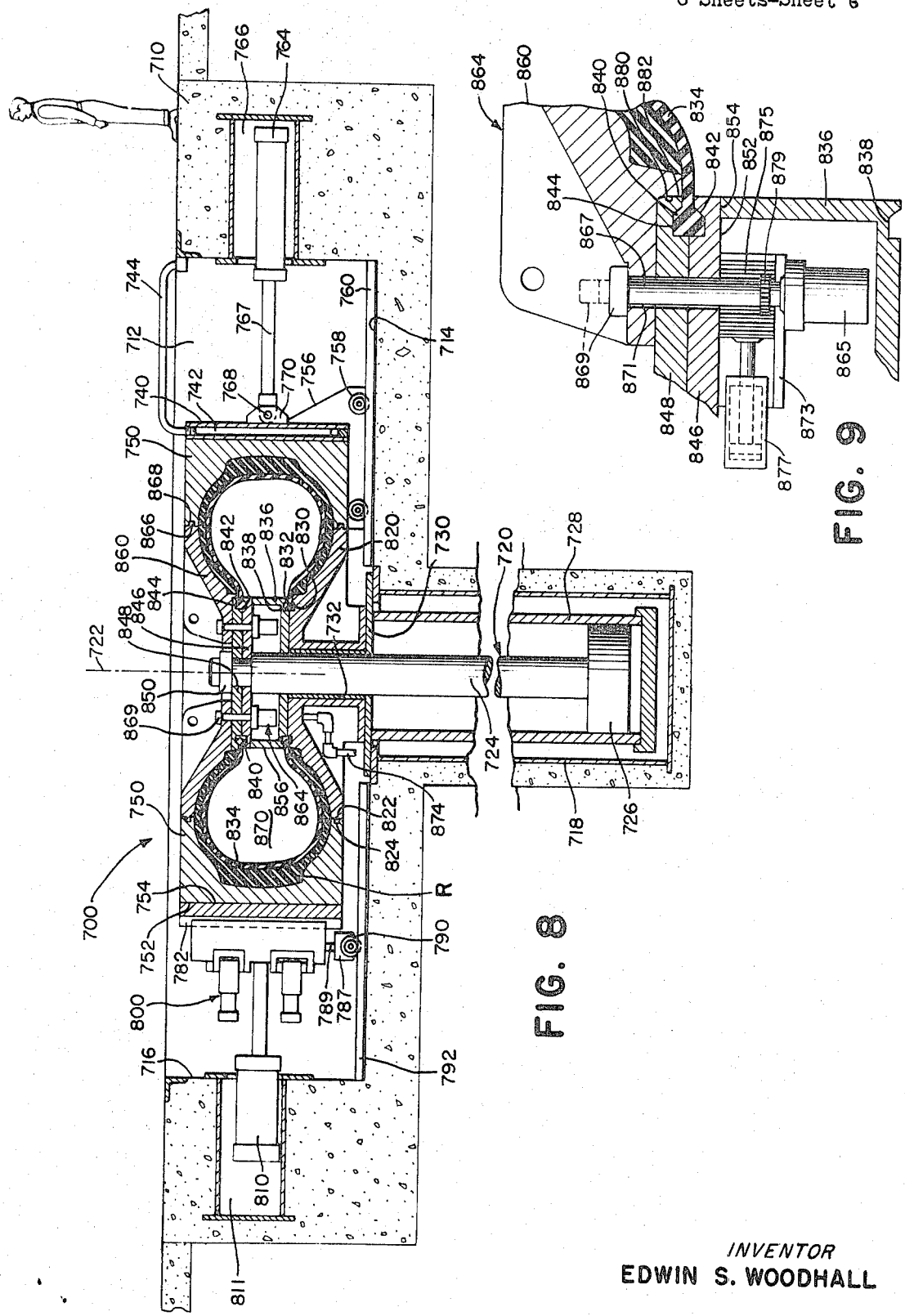

United States Patent Office 3,553,778
Patented Jan. 12, 1971

3,553,778
TIRE MOLDING APPARATUS
Edwin S. Woodhall, Cuyahoga Falls, Ohio, assignor to The Goodyear Tire & Rubber Company, Akron, Ohio, a corporation of Ohio
Filed July 1, 1968, Ser. No. 741,443
Int. Cl. B29h 5/02, 17/00
U.S. Cl. 18—17                                            27 Claims

ABSTRACT OF THE DISCLOSURE

Tire molding and curing apparatus including a plurality of tread molding means disposed about an axis and mounted for movement toward and away from the axis between a position wherein the tread molding means form a tire receiving cavity and a second position wherein the tread molding means are spaced apart. Clamping devices utilized to maintain the tread molding means in their inner cavity forming position so that all forces tending to separate the tread molding means are resisted within the same and the clamping means. Bead engageable means are provided to close the ends of the cavity with such bead engageable means including means to mold external surfaces of at least the bead portion of a tire. Bead engageable means are retained in position either by a center member extending coaxially of the cavity or by cooperably engageable means on the bead engageable means and tread molding means so as to provide a restraint for the bead engageable means which is entirely within the perimeter of the tread molding means. Tread molding means includes members supporting separate molding members and having means for providing heat to the molds with the heating means extending at least coextensively with the tread of the tire to be molded both in the direction circumferentially about the tire and in a direction parallel to the rotational axis of the tire.

---

The foregoing abstract is not to be taken as limiting the invention of this application, and in order to understand the full nature and extent of the technical disclosure of this application, reference must be made to the accompanying drawings and the following detailed description.

The present invention relates to novel and improved apparatus for molding and curing tires.

Tire presses of the prior art have characteristically been generally both massive and expensive. This has been true with respect to smaller presses such as used for passenger car tires, as well as larger presses for such tires as are used on off-the-road equipment. Particularly the larger size presses many times present extremely difficult problems with respect to transportation from the point of manufacture to the point of installation. Additionally, most prior art presses, at least in part because of the large, massive structures utilized to open and close the press, require an undesirably large amount of headroom in order to permit loading and unloading of tires into and out of the presses. Further, in certain types of presses, because of the nature thereof, the heat supplied to the exterior of the tire through the tire mold is not as uniform nor as efficient as would be desired.

It is an object of the instant invention to provide apparatus for molding and curing tires which will be substantially less massive than conventional presses presently in use so as to tend to provide reduced cost and provide a reduction in space requirements for installation.

A further object of the invention is to provide such apparatus having improved distribution of heat, including increased uniformity of heat distribution, within the mold for forming the external surfaces of a tire.

It is still another object of the present invention to provide novel and improved apparatus for molding and curing tires which is particularly adapted for use in molding and curing very large tires, yet which is of a construction which will facilitate transportation of the apparatus from a point of manufacture to a point of use.

Other objects will be in part obvious, and in part pointed out more in detail hereinafter.

In the description which follows, presently preferred embodiments are described by way of examples, enabling those skilled in the art to comprehend fully the invention, making reference throughout to the accompanying drawings in which:

FIG. 5 is a side elevation view, partly in cross-section of an alternative form of apparatus embodying features of the instant invention;

FIG. 6 is a cross-sectional view of the apparatus of FIG. 5 taken along the line 6—6 in FIG. 5;

FIG. 7 is a partial plan view of a further embodiment of the instant invention;

FIG. 8 is a transverse sectional elevation of the embodiment of FIG. 7, taken as indicated by the line 8—8 of FIG. 7; and FIG. 9 is an enlarged partial cross-sectional view of a portion of the apparatus of FIG. 8.

Figure 1:
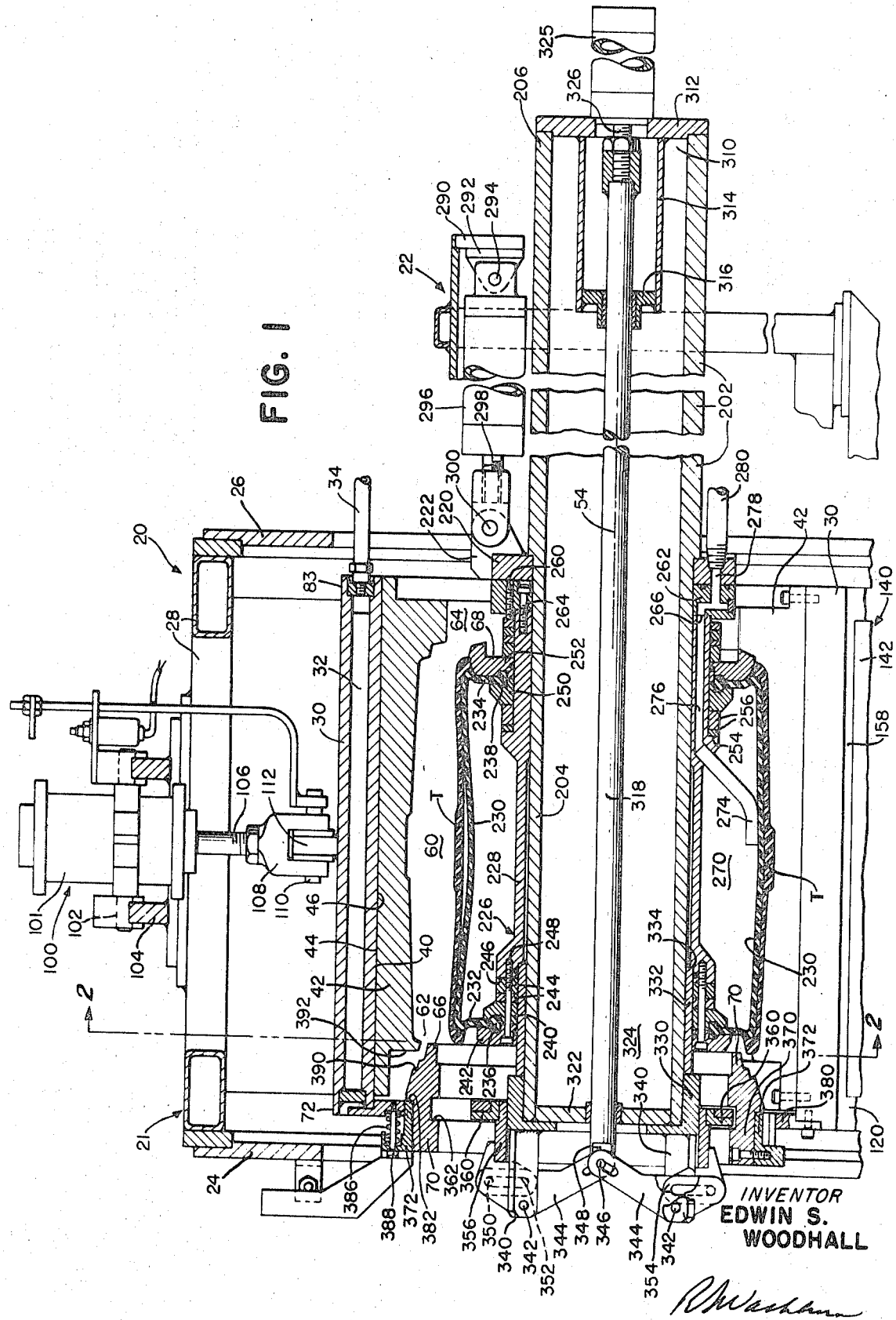
FIG. 1 is a side elevation view in cross-section of apparatus embodying features of the instant invention.
Figure 2:
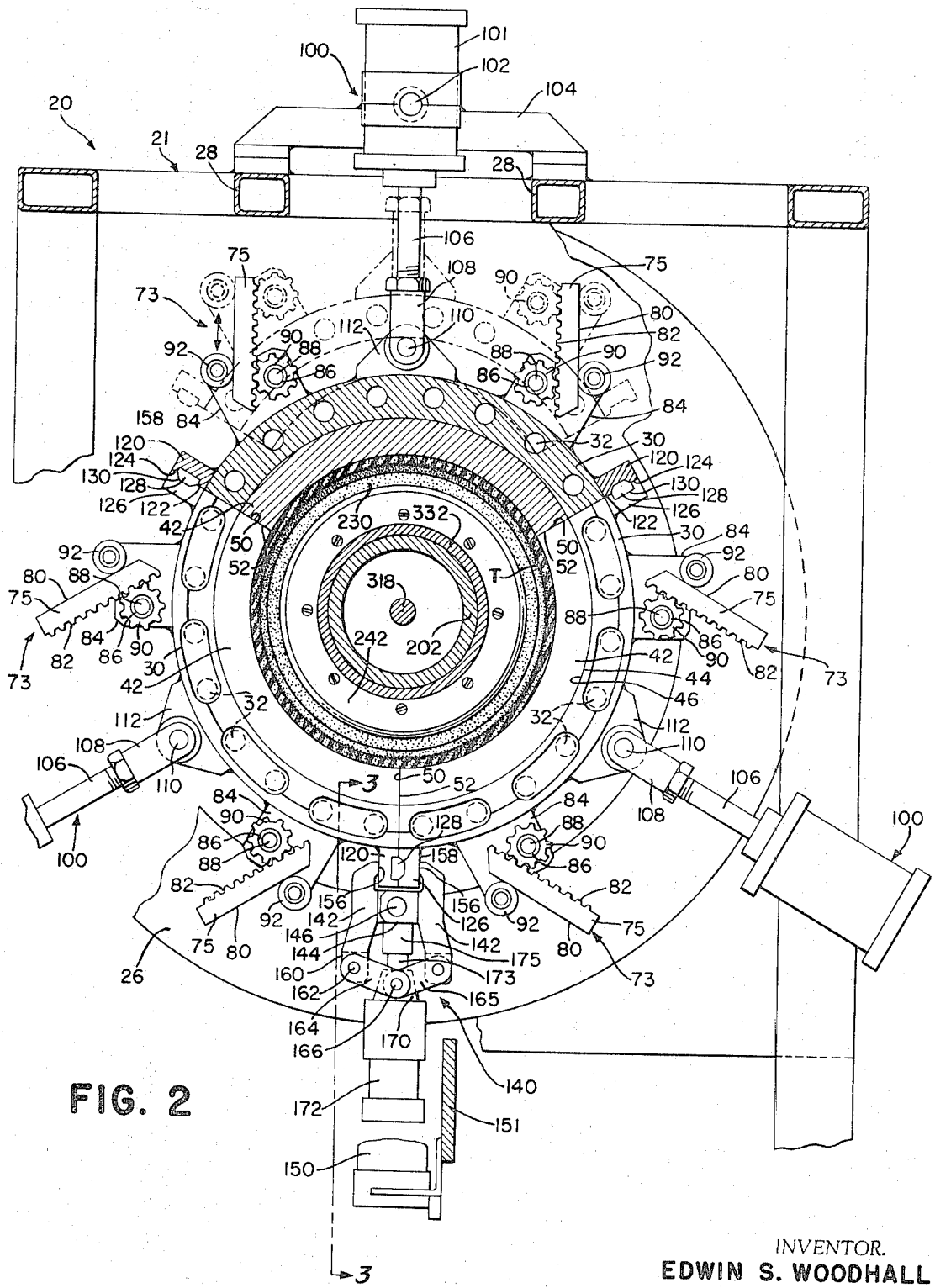
FIG. 2 is a front elevation view, partly in cross-section with portions broken away, of the apparatus of FIG. 1, the view being taken along the lines 2—2 of FIG. 1.

Referring now to the drawings and particularly to FIGS. 1 and 2, the apparatus 20 includes a press portion 21 and a ram portion 22, both mounted on suitable bases (not shown). The press portion 21 includes a front end plate 24 and a rear-end plate 26 joined by suitable cross-members including a frame tie 28. Disposed about a horizontal axis are a plurality of tread molding means each comprising an arcuate plate member 30 having heat transfer means therein in the form of passages 32 for heat transfer fluid extending longitudinally of the plates 30 and connected at their alternate ends to form a continuous passage adapted for conducting heat transfer fluid, such as steam. Flexible connectors 34 transport the fluid from and to a conventional heating plant (not shown). The arcuate plate members 30 cooperate to form a continuous cylinder extending axially substantially the distance between the end plates 24, 26. Each tread molding means further includes a mold cavity forming segment 42 having a parti-cylindrical outer surface 44 secured in good heat transfer relation to the corresponding inner cylindrical surface 46 of each plate member 30. The segments 42 extend substantially the full axial length of the plate members 30 and have arcuate widths terminating in end faces 50 and 52 disposed in planes radial to the axis 54 of the cylinder 40. Each end 50 of each segment 42 is adapted to abut snugly to the opposing end 52 of the adjacent segment.

The tire mold cavity 60 has open ends 62 and 64, closed by means in the form of bead engaging rings 66, 68, the ring 66 comprising a plurality of segments 70 supported at the outboard end 72 of the plate members 30 for radial movement therewith and for axial movement with respect to the members 30.

Each of the plate members 30 is adapted to move radially toward and away from the axis 54 and each is provided with parallel motion guide means 73 including the pair of guide members 75 each of which is provided with a cam track 80 and with a gear rack 82. Two of the guide members 75 are affixed to the inner surface of the rear-end plate 26 parallel to and spaced allochirally with respect to the radial direction of movement of the plate member 30. Two guide members 85 are likewise affixed to the inner surface of the front-end plate 24 at a spacing equal to the spacing of the guide members 75, parallel to and allochirally with respect to the said radial direction of movement of the plate 30. Suitably attached and spaced arcuately at each of the ends 72, 83 of each of the plate members 30 are a pair of lugs 84 each having a bearing 86 therethrough. A pair of rotatable shafts 88 extending parallel to the axis 54 are journaled in the bearings 86, each of the shafts 88 having a pinion 90 secured thereto in mesh with the respective gear rack 82. A roller 92 rotatably secured to each of the lugs engages the track 80 of one of the guide members 75, 85. The members 30 are supported in radially directed movement by the rollers 92 rather than by engagement of sliding surfaces.

Actuating means 100 for moving each of the plate members 30 radially with respect to the axis 54 is provided by a cylinder operator 101 having trunnions 102 supported in the bracket frame 104 secured to the frame as to the tie bar 28. Like the parallel motion guide means 75 previously described, the actuating means 100 is substantially identical for each of the plate members 30. The piston rod 106 of the cylinder operator 101 carries at its outer end a shackle 108 having a pin 110 engaged in a lug 112 which is attached centrally to the outer surface of the plate member 30. The cylinder 101 is connected to fluid pressure supply and control means (not shown) by which movement of the piston and rod 106 operates to move the arcuate plate 30 between a closed mold position wherein the arcuate plate members 30 cooperate to form a cylindrical body and an open position (as indicated in phantom outline in FIG. 2) wherein the members 30 are separated one from the other. The parallel guide means 75 described maintains each of the plate members in an orientation substantially parallel to the axis throughout the movement of the plate member.

Each of the arcuate members 30 is provided with a pair of locking flanges 120, 126 at its opposite ends respectively. The flanges extend the full length of the members 30 in a direction parallel to the central axis of the tread molding means. Each flange 120 terminates in a plane surface 122 disposed radially with respect to the axis 54. Each surface 122 of each lock flange 120 is adapted to abut snugly to the opposed radially extending plane surface 124 of the mating flange 126 carried by the next adjacent arcuate plate 30. A longitudinal key 128 seated in one of the two mating flanges fits within a key seat 130 in the other of the mating flanges to effect registering of the tread molding means and prevent disalignment of the same.

Figure 3:
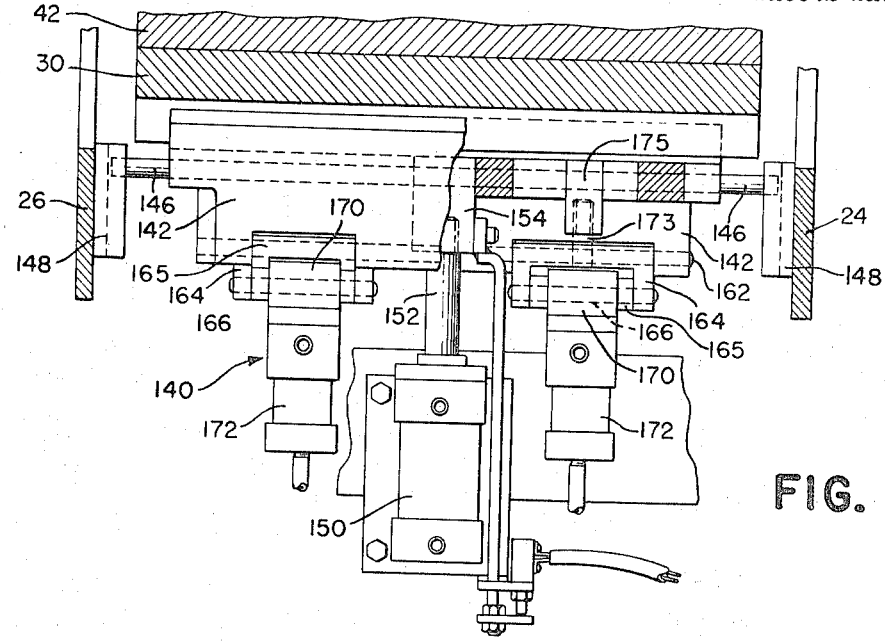
FIG. 3 is a partial view of the apparatus of FIG. 1 taken along the line 3—3 in FIG. 2.

Referring now more particularly to FIGS. 2 and 3, the apparatus 20 includes restraining means in the form of a clamping device 140 operatively engageable with each next adjacent pair of mating flanges 120, 126. The devices 140 being substantially identical, description of one is deemed to suffice for the plurality thereof. Each device 140 includes two relatively movable members in the form of a pair of clamp jaws 142 extending substantially the full length of the flanges 120, 126 and having respectively intercalated hinge lugs 144, disposed in the medial portion of the jaws 142 and bored to receive a clamp hinge or pivot pin 146 which extends substantially from the front-end plate 24 to the rear-end plate 26 where the respective ends of the hinge pins 146 are received in guide channels 148 disposed respectively on the frame end plate 24, 26 and radially with respect to the axis 54. Associated with each clamping device 140 is a cylinder operator 150 secured to support means in the form of the frame cross-member 151 and having a piston rod 152 threadedly engaged in a trunnion block 154 which is bored to receive the hinge pin 146 therethrough. The cylinder 150 is connected to conventional fluid power supply and control means (not shown) whereby the clamp jaws 142 are caused to move radially toward and away from clamping relation with the locking flanges 120, 126. The clamp jaws 142 each have a clamping surface 156 engageable with an exposed surface or shoulder 158 on the clamping or lock flanges 120, 126. The outer end 160 of each of the clamp jaws 142 is bored to receive a hinge pin 162 to which is pivotally connected one end of a pair of toggling links 164, 165 the other ends of which are pivotally connected to the toggle pins 166 fixed to the heads 170 respectively of a pair of locking cylinders 172 disposed allochirally with respect to the lock moving cylinder 150. The piston rods 173 of the cylinder motors 172 are connected to and carried by trunnion blocks 175. The hinge rods 146 and the actuating cylinders 172 are carried by the toggling links 164 and 165 so that the actuating means is self-contained in the device 140 and movable therewith by movement of the cylinder motor 150. The locking cylinders 172 are connected to a fluid pressure supply and control means (not shown) whereby the toggles 166 are urged toward the hinge pin 146, thereby exerting a greatly multiplied clamping force, in the manner known as characterizing toggle linkages, upon the surfaces 158 of the lock flanges 120, 126 engaged by the clamping surfaces 156.

As best shown in FIG. 1, the apparatus 20 includes ram means 22 adapted to move an uncured tire T into suitable register with the cavity 60 formed by the mold segments 42 and to move the tire T outwardly clear of the press portion 21 of the apparatus 20 to enable loading and unloading of successive tires. The ram means 22 is movable longitudinally of itself along the axis 54 of the cylinder formed by the plate members 30. The ram means includes a tube 202, of structural material such as steel, having a bladder core portion 204 and a rearwardly extending portion 206. The portion 206 is provided (referring to FIG. 6, the section thereshown being also representative of the ram means 22) with a plurality of flats or tracks 208 on the tube 202 and rollers 210 secured in the ram portion frame 212 so as to support the ram for translating movement. Secured concentrically to an intermediate portion of the outside of the tube 202 is a collar 220 having a projecting ear 222. Mounted coaxially around the bladder core portion 204 of the tube 202 is a bladder assembly 226 comprising a shell 228 and an elastomeric tubular bladder membrane 230 having inwardly turned annular ends 232, 234 terminating in circular beads 236, 238. The outboard bead 236 is clamped between inner 240 and outer 242 rings secured, with suitable spacers 244, to the shell end face 246 by cap screws 248. The inner or inboard bead 238 is clamped between inner 250 and outer 252 bead clamp rings and is secured to the face or shoulder 254 of the shell 228 together with suitable spacers 256 urged against the shoulder 254 by screws 260 in an end ring 262 secured by cap screws 264 to the end face 266 of the shell 228.

The assembly 226 of the shell 228 and membrane 230 together with the clamp rings and suitable spacers forms an annular chamber 270 disposed concentrically with respect to the axis 54 and the bladder core portion 204 of the tube 202. A fluid passage including the flexible siphon tube 274 and a longitudinal passage 276 in the wall of the shell 228 communicates with a connecting passage 278 in the end ring 262 and in the collar 220 to flexible conduit means 280 connected with conventional heat transfer fluid supply and control means (not shown) whereby the pressure within the chamber may be controlled to the desired level above or below atmospheric pressure.

The ram portion frame 212 is provided with a bracket 290 and a clevis 292 receiving the foot pin 294 of a cylinder operator 296, the piston rod 298 of which is connected by a pin 300 to the ear 222 of the collar 220 on the ram tube 202. The cylinder operator 296 is connected in the conventional manner to fluid pressure supply and control means (not shown).

Figure 4:
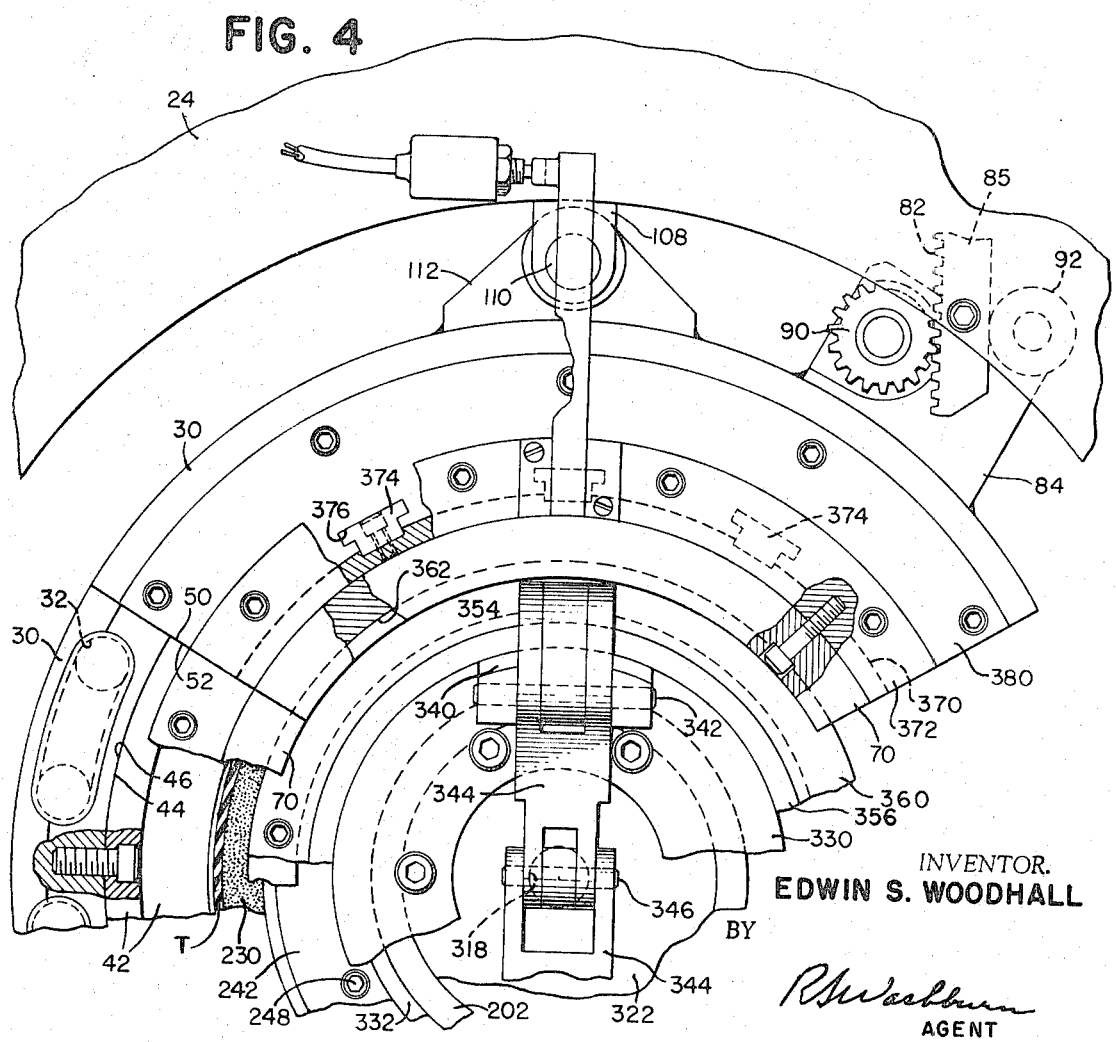
FIG. 4 is a front elevation view of a portion of the apparatus of FIG. 1, portions being broken away.

As may be seen in FIGS 1 and 4, the apparatus 20 includes means for actuating the mold end ring 66 referred to in connection with FIG. 1. The rearward end 310 of the ram tube 202 is closed by a cylinder mounting bracket 312 having a bearer frame 314 provided with a support 316 for a push rod 318 extended through the tube 202 and also supported for axial movement in the head 322 secured in the outboard end 324 of the tube. The bracket 312 carries a cylinder operator 325 having its piston rod 326 threadedly attached collinearly with the push rod 318 and connected to conventional fluid power means (not shown).

Affixed to the head 322 is an end cap 330 fitted concentrically about the tube 202 against a spacer sleeve 332 which bears against the annular shoulder 334 of the shell 228 to press the shell 228 and end ring 262 against the collar 220. The end cap 330 is provided with a pair of arms 340 each receiving a pin 342 carrying a crank or lever link 344 having slots engaging a toggle 346 secured in the outward end 348 of the push rod 318. At the other end of each lever 344 a pin 350 therein is engaged in a slot 352 disposed radially in ears 354 secured to an actuating ring 356 which is fitted in coaxially sliding engagement with the ed cap 330. A locking ring 360 is attached concentrically on the actuating ring 356 and is engageable with an annular seating groove 362 in the mold end or bead engaging ring 66 which comprises the plurality of arcuate segments 70 mounted for radial movement on and with the arcuate plate members 30 as previously described. Each of the ring segments 70 is mounted on an arcuate portion 370 of a bearer ring 372 having T blocks 374 received in T slots 376, respectively, of arcuate ring portions 380 attached to the plate members 30. The segments 70 are movable axially between a first or rest position, as shown, in which the shoulder 390 of the segment 70 is spaced from the outboard face 392 of the mold segment 42 and a second position where the shoulder 390 of the segment 70 engages the outboard face 392 of the mold segment 42. The springs 386 bias the segments 70 toward said first position.

Operation of the apparatus 20, shown in FIG. 1, may be described as beginning with the loading of an uncured tire T. The plurality of tread molding means including the arcuate plate members 30 and the respectively attached mold segments 42 are displaced radially outward from the axis 54 to locate these portions of the apparatus in the position shown on the upper side of the bladder assembly 226 in FIG. 1, and the bladder assembly 226 is extended outwardly clear of the mold cavity 60 and of the front end plate 24, moving leftward as seen in FIG. 1. The bladder 230 is contracted, the pressure within the chamber 270 being reduced to, or if desired, below atmospheric pressure. An uncured tire is moved by any convenient path to the axially extended bladder assembly 226 and passed axially thereover into wrapping relation with the collapsed bladder 230. The ram means 22 is retracted, moving to the right in FIG. 1, to bring the bladder assembly 226 and the tire T thereon into axial registry with the tire mold cavity 60.

With the uncured tire body suitably located axially, the actuating means, the cylinder operators 101, are energized to move the arcuate plate members 30 each radially toward the axis 54 bringing the mating or abutting end faces 50, 52 together to form a cylinder and closing the circumference of the mold cavity 60, as shown by the location of these parts on the lower side of the bladder assembly 226 in FIG. 1. As the members 30 are moved into end to end engagement the keys 128 engage in the seats 130 to maintain the members 30 parallel and at equal radii relative to the axis 54. Subsequently the clamping devices 140 are engaged with the members 30 to maintain the members 30 in their inner position.

Movement of the arcuate plate members 30 causes movement of the arcuate portions or segments 70 of the bead engaging ring 66 mounted thereon, bringing its annular groove or lock ring seat 362 into engagement with the lock ring 360 carried by the sliding sleeve 356 on the ram end cap 330.

With the mold cavity 60 closed, arcuate portions 70 of the bead engaging ring 66 are closed in continuous circular arrangement and the cylinder operator is energized to move the rod 318 outwardly, to the left as seen in FIG. 1, moving the toggle 346 and urging the lever arms or bell cranks 344 to rotate about their respective pins 342 seated in the arms 340 of the end cap 330 causing the crank pins 350 to move the sliding sleeve 356 and with it the lock ring 360 and bead engaging ring 66 into closing relation with the open end 62 of the mold cavity 60. Only the sole and a portion of the heel of the bead portion of the uncured tire T is engaged by the ring 66.

With the mold closed, both circumferentially and axially, the chamber 270 is supplied with fluid, such as steam, to distend the bladder 230 and the surrounding tire T into molding contact with the inner surface of the tire mold cavity 60.

It will be evident from the foregoing description that each mold segment 42 receives heat directly from the arcuate plate member 30 throughout its length and width and that the segment is continuous in axial extent, engaging the entire outer surface of the tire T substantially from bead to bead, the particular tire shown being subject to negligible circumferential expansion prior to its removal from the mold press of apparatus 20. Moreover, as may be observed on inspection of the drawings, the axial component of the outward force applied to the end ring 66 and to the opposing end ring 68 is resisted entirely within the periphery of the mold segments 42 themselves and by the ram tube 202 connected with the rings 66, 68.

Following a time and temperature suitable for the cure of the particular tire, fluid pressure within the chamber 270 is reduced or exhausted and the cylinder operator 325 is actuated to draw the actuating rod 318 in, to the right in FIG. 1, causing the sleeve 356 with the lock ring 360 to move the bead engagement ring 66 outward to its home or rest position assisted by the springs 386. The bead engaging ring 66 movement completed, the arcuate plate members 30 are caused to move radially outward from the axis 54 by the cylinder operators 101 and the ram 202 is again extended, to the left in FIG. 1, and the now cured tire is removed from the bladder 230 and the cycle may be repeated.

Making reference now to FIG. 5, apparatus 400 according to a further embodiment of the invention comprises a first or press frame 402 including a front-end plate 404 and a rear-end plate 408 mounted upon a suitable base (not shown) and connected by cross-members such as the tie bars 410. The press portion 420 of the apparatus 400 is in many respects identical to the press portion 21 described in connection with FIGS. 1 through 4. The description which follows will therefore be concerned principally with the differences, reference being made to the foregoing description for the details of the like parts.

A plurality of tread molding means each comprising an arcuate plate member 430 are supported by the press frame 402, the members cooperating as before, to form a cylinder 432 extending axially between the front plate 404 and rear plate 408. In the apparatus 400, the members 430 are moved inwardly and outwardly of the axis 450 along parallel guide means identical to the guide means 73 of the apparatus 20, and are caused to move by the actuating means 100 previously described.

A plurality of mold segments or members are respectively secured to the inner surfaces of the plate members 430. Each segment 440 extends coextensively of the respective plate member 430 both in a direction parallel to the central axis 450 and in a direction about said axis. As before, the mold cavity segments 440 terminate in end faces disposed in planes radial to and containing the axis 450 of the cylinder, and each end of each mold segment is adapted to abut snugly to the opposing end of the next adjacent segment in the same manner as described in connection with the apparatus 20. Each mold member 440 extends entirely across the tread of a tire to be molded thereby. Each mold segment 440 is provided with portions of two annular grooves 454, 456 adapted to receive, respectively, portions of the annular flanges 458, 460 disposed concentrically on the bead engageable rings 462, 464 which are disposed to close the end openings of the mold cavity 470. As in the case of the bead engageable means of the other embodiments described herein, the bead engageable means or rings 462, 464 include a molding portion or member for molding external surfaces of at least the bead portion of the tire and with the tread molding means provide the means for molding the entire external surface of the tire. In the case of the bead engageable means 462, 464, these include means to mold also the lower sidewall portions of the tire. Locking means for the rings 462, 464 and the axially continuous mold segments 440 takes the form of tongue-and-groove joints provided by the engagement of the annular flanges 458, 460 of the rings 462, 464 and the annular groove 454, 456 portions in each of the mold segments. As in the case of the previously described plate members 30, the members 430 are provided with heating means extending at least substantially coextensively with the tread receiving portion of the cavity formed by said member 430. As in the previously described apparatus 20, the members 430 are provided with locking flanges identical to the flanges 120, 126 of the members 30, which cooperate with restraining means in the form of self-contained clamping devices identical with the devices 140 already described. Also, keys and key seats are provided for each cooperating pair of locking flanges in the same manner and for the same purpose as described in connection with the keys 128 and seats 130 previously described.

The bladder means 472 is subject to super-atmospheric pressure within the chamber 474 which exerts an axially directed force tending to move the rings 462, 464 axially outwardly of the cavity 470. This force component is resisted entirely by the mold segments 440. It is a particular advantage in the molding and curing press of the present invention that there is no requirement for cumbersome, expensive and space consuming tension members disposed outside of the mold to resist the axial forces tending to separate the portions of the mold. Each of the grooves 454, 456 is chamfered to provide a conical surface which facilitates the entry of the flanges 458, 460 of the end rings into the grooves as the mold segments 440 move radially inwardly. Each of the annular flanges 458, 460 is likewise provided with chamfers.

The apparatus 400 includes ram means 500 which is movable along an axis 502 longitudinally of itself and collinear with the axis 450 of the cylinder 432 formed by the plate members 430. The rearward extending portion 510 of the ram means 500 includes a tube 512 having, referring to FIG. 6, flats or tracks 208 on the outer surface of tube 512 and extending longitudinally thereof. The tracks 208 are carried by the rollers 210 carried by the ram portion frame 520. A tubular bushing or adaptor 522 is secured concentrically within the forward end 524 of the tube 512 by a split ring clamp 526 and cap screws 528. A pair of slide bearings 530 are seated in a bore 532 extending coaxially through the bushing 522 and receiving a second tube or quill 534 which forms the forward end portion of the ram. The quill 534 is provided with a longitudinal slot or channel 536 which is engaged by a pin 538 secured in the bushing 522 to prevent rotation of the quill 534. A flange 540 extending radially from the outward end of the bushing 522 is attached to a clamp ring 542 of a sleeve 546 fitted coaxially about the quill 534 and supporting on its outer cylindrical surface inboard bladder bead 549 and the clamping rings 550, 552. The outer clamp ring forms a part of the tire bead engaging ring 464 previously described. The inner clamp ring 550 is urged against the shoulder 554 of the bladder mounting sleeve 546 by a plurality of suitable spacers 558 and by the screws 560 in the sleeve clamp ring 542. It will be apparent that the bladder bead clamp ring 552, the tire bead engaging ring 464 and the bladder mounting sleeve 546 are attached to and moved axially as a unit with the first or outer tube 512 of the ram means 500.

The outboard bead 566 of the bladder means 472 is secured between the bead clamp rings 568, 570 carried by the second or inner tube 534 of the ram means 500 between a split ring locator 572 seated in the groove 574 in the tube 534 and a quill head 576 fastened to the outer end 578 of the tube 534.

An adaptor ring 580 having an annular tongue 582, arcuate portions of which are interrupted or cut away, is secured to the quill head by a matingly interrupted annular groove 584 such that in one angular position portions of the tongue are engaged in portions of the groove and in a second position, angularly displaced from the first, the tongue portions can move axially through the discontinuities or interruptions of the groove and the groove portions can likewise move axially through interruptions or discontinuities of the tongue. The outboard engageable ring 462 is removably secured to the adaptor 580 by a tongue-and-groove device like that just described. The ring 462 is thus secured to the quill or second tube 534 of the ram means 500 so as to move axially therewith toward and away from the bead engageable ring 464 secured to the outer or first tube portion 512 of the ram means 500.

Adjustment of the axial spacing between the respective bead engageable rings 462, 464 and between the bladder bead clamps 570 and 550 is provided by front adjustment adjustment screw 590 having wrench flats 592 and journaled in a bore 594 in the quill head 576 and at its other end carried in a bearing 596 seated in the tube head fitting 598 which is attached to the inner end 600 of the quill 534. The adjustment screw 590 is threadely engaged in a nut 602 having a pair of keys 604 fastened thereto by the cap screws 606, the keys 604 being slidable in and along the slots or channels 536 which extend longitudinally in the wall of the quill 534. The keys 604 extend radially from the quill 534 a sufficient distance to engage positively with an end face 610 of the adaptor bushing 522 and thereby provide a positive stop limiting the forward or outward motion of the quill 534 with respect to the first tube 512 of the ram means 500. The stop position is adjustable by means of the screw 590.

The tube head fitting 598 is attached by a pin 620 to a clevis 622 received by the threaded end of this piston rod 624 of the fluid pressure cylinder operator 630, the head end of which is supported by a pin 632 in a swiveling clevis 634 carried by one end of the second adjusting screw 640 which is threadedly fitted in a head 642 closing the rearward end 644 of the first tube 512. The outer end of the screw is also provided with wrench flats 646 by which the rearward or inward axial limit or stop position of the quill or second tube 534 can be adjusted. Positive stop means for the inward end of the quill travel includes the end of stroke engagement of the piston and the head end of the cylinder 630.

The ram frame 520, as before, is provided with a foot bracket 650 having a pin 652 engaging the head mounting tongue 654 of a fluid pressure cylinder operator 656, the piston rod 658 of which carries a clevis 660 pinned to a bracket 662 affixed to the outward end 644 of the first tube 512. The cylinder operator 656 is connected to conventional supply and control means (not shown) whereby the ram means 500 is caused to move axially carrying the bladder means 472 into axial registry with the mold cavity 470 and outward therefrom clear of the press 420.

Operation of the apparatus 400, shown in FIG. 5, may be described in connection with a relatively more conventionally shaped tire S. Beginning with the press arcuate members 430 moved radially away from the axis 450 and with the ram means 500 fully extended to the left, as seen in FIG. 5, the second or inner tube 534 is extended outwardly with respect to the first tube 512 by operation of the shaping cylinder 630 which brings the nut 602 into engagement with the end face 610 of the adaptor bushing 522 and moves the outboard bead portion 566 of the bladder means 472 away from the inboard bead portion 549 of the bladder 472 so that it is returned generally to its natural cylindrical shape. The rearward or first tube portion 512 of the ram means 500 also moves outwardly, to the left in FIG. 5, to extend the bladder 472 axially outward, clear of the tire mold cavity and of the front-end plate.

With the ram and quill 534 fully extended, an uncured tire is placed axially over the ram in wrapping relation with the bladder 472 with its tire inboard bead placed in suitable relation with the bead engaging ring 464. With the tire in place about the bladder 472 the outboard bead engaging ring 462 is engaged by the bayonet lock means, or tongue-and-groove connection 580, 582, on the quill head 576 and rotated into its locked position. The shaping cylinder operator 630 is then energized to move the respective bead engaging rings 462, 464 axially toward one another, fluid being admitted into the chamber 474 of the bladder means to initiate the shaping of the cylindrical uncured tire S toward its generally toroidal shape.

As the rings 462, 464 approach a predetermined axial location in registry with the tire molding cavity 470, the cylinder operator 100 is energized to move the plate members 430 toward the axis 450 together with the respective cavity forming mold segments 440; the grooves 454, 456 engage the flanges 458, 460 respectively so as to register and lock the rings 462, 464 into suitable mold closed position.

The ram means movement is coordinated with the shaping cylinder movement so as to bring the inboard ring flange 460 into registry with the grooves 456 of the plurality of mold segments 440 coincidently with the engagement of the outboard ring flange 458 with the corresponding groove 454 in the mold segments.

Upon completion of the radially inward movement of the plurality of arcuate plate members 430, the previously described and shown in FIG. 2, lock moving cylinder 150 is activated to bring the clamping device 140 into relation with the lock flanges 120, 126 of the plate members 430. Upon completion of the inward movement of the clamp device 140, the locking cylinders 172 are activated to apply clamping force drawing the toggle pins 166 in the cylinder heads toward the hinge rod 162 so as to cause the clamp jaws 142 themselves to engage forceably with the exposed surfaces or shoulders 158 of the lock flanges 120, 126.

Shown in FIGS. 7 and 8, apparatus 700 according to the invention and particularly adapted for the molding and curing of tires of great size further illustrates features and advantages of the instant invention. In the present embodiment the press frame portion of the apparatus 700 is provided by foundation means 710 including a polygonal pit 712 having a floor 714 and a generally vertical wall 716 encompassing the pit.

Extending downwardly from the pit floor 714, a ram frame portion in the form of a generally cylindrical well 718 is adapted to receive ram means 720 reciprocable along a vertical axis 722 perpendicular to the floor 714. The ram means includes a ram 724 attached to a piston 726 fitted within a hydraulic cylinder 728 having a head 730 equipped with a conventional gland 732 through which the ram 724 is movable.

The foundation means 710 including the floor, wall portion 716 and the central well 718 for the receipt of the ram means are readily constructed of, for example, concrete aggregates or other generally readily obtainable materials, at or convenient to the site where the tire to be cured is required for use. The instant embodiment of the invention finds particular utility for molding and curing tires of great size. Shipment of tires having diameters in excess of about 12 feet by conventional modes of transport is both difficult and uneconomical because of clearance limitations along reasonably available direct routes.

Like the previously described embodiments, the present apparatus 700 includes a plurality of arcuate plate members 740 each having heat transfer passages 742 accommodating heat transfer fluid and extending throughout the plate members in directions generally parallel to the axis 722 and connected by flexible connectors 744 to a conventional fluid heating system (not shown). The arcuate plate members 740 cooperate to form a continuous cylinder 742 disposed about the axis 722 and extending generally vertically with respect to the floor of the pit. A plurality of mold cavity forming segments 750 having cylindrical outer surfaces 752 are secured respectively in good heat transfer relation to the corresponding inner cylindrical surfaces 754 of the plate members. Each member 740 and its associated mold cavity segment 750 is supported on a carriage 756 having parallel motion guide means in the form of wheels 758 supported on the tracks 760 extending radially with respect to the axis 722 to accommodate movement of the plate member 740 and the associated mold segment 750 toward and away from the vertical axis 722 to define in the first or inner position a circumferentially closed cavity and to be spaced apart one from another in the second position.

Movement of each of the plate members 740 is effected by actuating means in the form of hydraulic cylinders 764 each mounted within a respective aperture 766 in the wall portion 716 of the foundation 710. Each of the hydraulic cylinders 764 is provided with a piston rod 767 having a rod end pin 768 connected to a pair of lugs 770 attached centrally to the outer surface 772 of each of the plate members 740. Each cylinder is connected to fluid pressure supply and control means (not shown) by which movement of the piston and rod 767 operates to move the arcuate plate 740 between a closed mold position wherein the arcuate plate members cooperate to form a cylindrical body and an open position wherein the members are separated from one another.

Like the previously described embodiments, each of the arcuate members 740 is provided with a pair of locking flanges 780, 782 each terminating in plane surfaces 784 disposed radially with respect to the axis 722. Each surface of each locking flange 780 is adapted to abut snugly to the opposed surface 784 of the flange 782 carried by the next adjacent arcuate plate. A longitudinal key 786 seated in one of the flanges engages a key seat 788 in the other of the flanges in the same manner and for the same purpose as in the previously described embodiment.

The present embodiment includes a clamping device 800, in significant respects, except size, like the clamping device 140 described in connection with FIGS. 2 and 3, including a cylinder operator 810 supported in an aperture 811 in the wall 716. The cylinder 810 is connected to conventional fluid power supply and control means (not shown) whereby the clamp jaws 812, 814 are caused to move radially to and away from clamping relation with the lock flanges 780, 782. The device 800 is also supported so that the jaws 812, 814 remain parallel to the axis 722 during radial movement of the device with respect to the axis 722 by a dolly 787 attached to the hinge pin 789. The dolly wheels 790 roll on guide means such as the rails 792.

Secured to the previously mentioned head 730 is a bead engaging ring 820 disposed concentrically and coaxially with respect to the ram means 720 and having about its periphery an annular flange or tongue 822 engageable with a mating annular groove portion 824 provided in each of the mold segments 750 respectively.

An annular groove 830 in the end plate or bead engaging ring 820 receives the lower bead 832 of an expansible elastomeric bladder or membrane 834. An impervious clamp member 836 has an outer diameter only sufficiently smaller than the inmost diameter of a tire to be molded so that the tire can pass readily thereover into registry with the mold cavity. The member 836 extends axially to form an inner boundary or wall extending axially between the head 730 to a fluid tight engagement with the surfaces of the plate 846 and with the head 730. The clamp member 836 having a corresponding annular groove 838 is secured to the upper face of the bead engaging ring 820 and serves to clamp the bead 832 in concentric relation with the axis 722.

The upper or outboard bead 840 of the bladder 834 is secured in a facing pair of annular grooves 842, 844 respectively in a pair of bead clamping plates 846, 848 fixed to the outer or upper end of the ram 724 by a clamping plate 850 which is secured to the outer end of the ram 724 by conventional means. The lower surface 852 of the plate 846 engages the upper surface 854 of the annular wall portion 856 of the clamp member 836 to establish the desired spacing between the bead portions of the bladder 834.

An upper or outboard bead engaging ring member 860 is removably secured to the plates 846, 848 by a plurality of holddown devices 864 adapted to secure the ring 860 to the plates and ram without relative rotation therebetween.

Shown also in enlarged detail in FIG. 9, the locking device 864 includes a hydraulically operated hold-down cylinder 865 having a piston and piston rod 867 terminating in its upper or outer end in a T-head 869, the rod passing through suitable openings in the plates 846 and 848 and through an elongated slot 871 formed in the ring member 860. The hydraulic cylinder 865 is mounted on the spacer housing 873 which is secured by conventional means to the plate 846. In the housing a gear rack 875 is supported for reciprocating movement actuated by an air cylinder 877 which can, and preferably is, remotely actuated to cause the pinion 879, which is keyed to the rod 867, to rotate through approximately 90 degrees so that the T-head may alternately be placed with its longer dimension substantially aligned with long dimension of the slot 871, or with its long dimension at approximately 90 degrees with respect to the long dimension of the slot 871.

The impervious member 836 occupies the central transverse area defined by the tire bead diameter and serves to exclude fluid pressure within the tire mold cavity from acting on the central areas of the bead and sidewall members 820 and 860 within the circumference of the member 836.

The periphery of the end ring 860 is provided with an annular tongue 866 engageable with annular groove portions 868 respectively in each of the mold segments 750 in the manner described in connection with the end ring 820.

Means for the supply of pressure and heating fluid into the chamber 870 of the bladder 834 and for exhausting condensate and noncondensibles therefrom are provided in the form of a plurality of pipes 874 passing through the lower end bead engaging ring member 820 and communicating with conventional fluid heating means (not shown).

Operation of the apparatus 700 may be described as beginning with the arcuate plate members 740 retracted, away from the axis, and with the ram 724 extended upwardly to cause the membrane or bladder 834 to be extended so as to form a cylinder generally coaxial with the ram, and in such a way that the maximum diameter of the bladder is reduced to a diameter less than the inner diameter of the beads of a tire R to be cured.

An uncured tire R is lowered into position surrounding the ram and bladder 834 so that the lower bead of the uncured tire is received generally on the lower bead engaging ring member 820, by overhead crane means (not shown). The crane then is used to place the upper bead engaging ring member 860 upon the plate 848, the counterbore 880 of the ring 860 being registered by the outer circumference 882 of the plate. The locking devices 864 are actuated to secure the bead engaging ring 860 to the plate 848. The crane is released and the ram 724 begins downward movement and pressurizing fluid is admitted into the chamber 870 of the bladder means to begin expansion of the bladder 834 to fill the cavity of the tire as the ram moves downward. The arcuate plate members 740, together with the mold cavity segments 750, are brought inward toward the central axis 722, the grooves 824, 868 of the segments 750 engaging the tongues 822, 866 of the bead engaging rings 820, 860. The locking devices 800 are moved radially inwardly and clamp the locking flanges 780, 782 of the arcuate plate members 740.

When the curing cycle is complete, the sequence of operations generally is reversed. The fluid pressure within the bladder 834 is reduced. The devices 800 are declamped and retracted. The mold cavity forming segments 750 and arcuate plate members 720 are retracted away from the central axis 722, the locking devices 864 are released and the upper bead engaging ring 860 removed by the overhead crane. The ram 724 is moved upward, which action causes the bladder 834 to extend longitudinally from its toroidal inflated condition to its cylindrical form. The crane is again brought into position and the completed tire R is removed and the apparatus is then ready to receive a second uncured tire.

The foregoing description will have made apparent advantages of a tire molding and curing apparatus in accordance with the instant invention. A notable advantage especially applicable to tires characterized by small ratios of section height to section width is that the plate members have heat transfer means capable of supplying heat directly into the cylinder enclosing the mold, and particularly across the tire tread and shoulder portions of the mold cavity where the thickness of the rubber or rubber-like material of the tire is likely to be greatest and to require the greatest amount of heat during the cure cycle.

A further advantage of the invention is the fact that axial loads resulting from the molding fluid pressures within the chamber of the bladder means are entirely contained without need for exterior tie bars as with conventional presses. The advantages are particularly apparent in the manufacture of tires of great size where the provision of conventional molding presses become prohibitive in cost in view of the presently realtively small number of such tires required by the market.

A further and notable advantage is the fact that tires may be brought into and removed from the axis along any convenient path without being impeded by portions of the press apparatus such as the overhanging platen and framework of the conventional tire molding press.

While certain representative embodiments and details have been shown for the purpose of illustrating the invention, it will be apparent to those skilled in this art that various changes and modifications may be made therein without departing from the spirit or scope of the invention.

What is claimed is:

1. Apparatus for molding a tire comprising mold means including a plurality of tread molding means disposed about an axis, means mounting each of said molding means for movement toward and away from said axis between a first inner position wherein said molding means cooperate to form a tire receiving cavity and a second outer position wherein said molding means are spaced apart in a direction extending about said axis to permit a tire to be moved coaxially of said molding means and into registry therewith, means for moving said tread molding means between said first and second positions, and wherein said means mounting said tread molding means includes guide means comprising a plurality of fixed tracks respectively associated with said plurality of tread molding means and each extending generally inwardly and outwardly of said axis parallel to the direction of movement of the respective tread molding means, and a plurality of roller means carried by said tread molding means and in rolling engagement respectively with said plurality of tracks.

2. In apparatus as described in claim 1, tire bead engageable means movable axially of said cavity to cooperate with said tread molding means to close an end portion of said cavity, ram means extending coaxially through said cavity and including means disposed within the perimeter of said tread molding means and cooperatively interengageable with means on said bead engageable means to prevent axially outward movement thereof while said molding means are in their said first position, said ram means further including a tubular bladder disposed concentrically of said axis and an air impermeable tubular member disposed between said bladder and axis, and means providing an air-tight seal between the ends of said bladder and the outer periphery of said tubular member, said tubular member having an outer diameter only sufficiently smaller than the inmost diameter of a tire to be molded so that the tire can pass readily thereover.

3. In apparatus as described in claim 1, said tread molding means including mold members defining in said first position of said tread molding means an axially continuous molding cavity which is cylindrically shaped and which is engageable in molding relation with the tread portion and at least a major part of the sidewall portion of a tire received in said cavity.

4. In apparatus as claimed in claim 3, each tread molding means including one of said mold members extending in a direction along said axis a distance at least as great as the axial width of a tire to be molded in said apparatus, and heating means comprising a plurality of continuous axially extending flow passages for conducting heat transfer fluid in each tread molding means extending the full width of said mold member in a plane perpendicular to said axis.

5. Apparatus as claimed in claim 1, including restraining means comprising a plurality of clamping means respectively associated with each immediately adjacent pair of the respective ends of said tread molding means and cooperably engageable with means on said tread molding means.

6. In apparatus as described in claim 5, each clamping means comprising a pair of jaw means extending over at least a majority of the length of the respectively associated pair of tread molding means as measured in a direction parallel to said axis, each said next adjacent pair of tread molding means having a pair of elongated shoulder means extending at least substantially coextensively with said jaw means and which are engageable by said jaw means, each said clamping means being a self-contained unit including drive means for actuating said jaw means.

7. In apparatus as claimed in claim 5, said plurality of tread molding means when in said second position being separated and disconnected from one another, each of said clamping means including a movable jaw clamp, and means carried with each clamp to actuate each clamp to clampingly engage the same with said means on the respectively associated pair of tread molding means subsequent to movement of said molding means into said first position.

8. In apparatus as described in claim 5, means mounting said clamping means for movement toward and away from said tread molding means, each clamping means including an actuator therefor which is carried therewith.

9. In apparatus as described in claim 5, each of said clamping means comprising a pair of jaw members, means connecting said jaw members for relative movement therebetween, drive means connected to and carried with said members and said means connecting said jaw members for effecting relative movement between said jaw members.

10. In apparatus as described in claim 9, said means connecting said jaw members comprising a pivot pin, said drive means comprising a fluid motor having a piston and a cylinder one of which is drivingly connected to said jaw members and the other of which is connected to said pivot pin.

11. In apparatus as claimed in claim 5, said restraining means being provided with means for moving said restraining means into and out of engagement with the respective said tread molding means and being operable when in engagement with said means on said molding means to retain said tread molding means in said first position.

12. In apparatus as claimed in claim 11, said means on said tread molding means including a pair of shoulders on each next adjacent pair of said tread molding means, said restraining means including a plurality of pairs of jaws, each pair of jaws being engageable with a pair of said shoulders to apply mutually opposed clamping forces thereon.

13. Apparatus as claimed in claim 1, tire bead engageable means movable toward and away from one end of said cavity and cooperable with said tread molding means for closing said one end of said cavity, said bead engageable means comprising a molding member for engaging and molding external surfaces of the bead portion and at most the lower sidewall portion of a tire received in said cavity, and locking means comprising cooperably interengageable means on said bead engageable means and on said tread molding means and movable into engagement during movement of said tread molding means toward said first position to prevent axial movement of said bead engageable means out of position closing said one end during molding of a tire in the apparatus.

14. In apparatus as described in claim 13, said interengageable means comprising a projection on one and a recess on the other of said bead engageable means and said tread molding means.

15. In apparatus as described in claim 13, drive means extending coaxially of said cavity for moving said bead engageable means vertically, and power means detachably connecting said bead engageable means to said drive means to permit removal of said bead engageable means for loading and unloading of the apparatus.

16. In apparatus as claimed in claim 13, each of said tread molding means including a mold member extending as a unit parallel to said axis at least coextensively with the tread portion of a tire to be molded in said apparatus, said mold members of said tread molding means and of said bead engageable means cooperating to form the entire molding surface for the exterior of said tire, means for maintaining said tread molding means in said first position comprising a plurality of self-contained clamping means engageable with a plurality of shoulder means on said tread molding means when said tread molding means when said tread molding means are in said first position, and means for moving said clamping means toward and away from said tread molding means.

17. In apparatus as claimed in claim 13, a second bead engageable means for closing the other end of said cavity, a fluid impervious rigid cylindrical member disposed coaxially of said cavity and having an outermost diameter not significantly less than the inmost diameter of a tire to be molded in said apparatus, said impervious member extending axially of the cavity into cooperative fluid-tight engagement with means on one of said bead engageable members and with means on the other bead engageable means to prevent fluid pressure from acting outwardly in an axial direction within said member when said tread molding means are in said first position.

18. In apparatus as claimed in claim 17, ram means extending coaxially of said tread molding means, a tubular bladder surrounding said ram means, means including said fluid impervious means anchoring one annular end of said bladder relative to said axis and means mounting the other annular end of said bladder for movement with said ram means.

19. An apparatus as claimed in claim 13, said axis extending vertically, vertically extending fixed support means disposed about said axis, and a plurality of drive means fixed on said support means and respectively on each said tread molding means, each said drive means being reversibly extendable between one of said tread molding means and said support means to move the respective said tread molding means toward and away from said axis.

20. Apparatus as claimed in claim 19, wherein said support means are provided by the walls of a pit within which said tread molding means are disposed, said pit having a floor, and wherein said track means are supported on said floor.

21. Apparatus as claimed in claim 19, further comprising means for moving a plurality of clamping means respectively toward and away from the respectively immediately adjacent ends of said tread molding means when said tread molding means are in said first position thereof, and actuator means carried by each of said clamping means for effecting clamping engagement of said clamping means with means carried by said tread molding means.

22. In apparatus as described in claim 13, said bead engageable means including said molding member comprising a plurality of segments mounted for movement toward and away from said axis between an inner position in which said segments cooperate with each other to provide a closure for said one end of said cavity and an outer position in which said segments are spaced apart and a tire may be moved coaxially of said cavity through said bead engageable means and said one end.

23. In apparatus as claimed in claim 22, means mounting said segments on said tread molding means for movement therewith toward and away from said axis, means engageable with said segments for movement thereof relative to said tread molding means and parallel to said axis, the last said means being disposed within the perimeter of said tread molding means and including drive means to effect movement of said segments parallel to said axis.

24. In apparatus as described in claim 22, means mounting said segments on said tread molding means for movement therewith toward and away from said axis and for movement relative thereto and parallel to said axis, said means on said bead engageable means including a recess on each segment facing said axis, means disposed within the perimeter of said tread molding means including a ring disposed coaxially of said axis and receivable by the recesses on said segments, and means for moving said ring along said axis and for maintaining the ring in a position effective to close said end of said cavity by said segments.

25. An apparatus as claimed in claim 22, said tread molding means including mold members defining in said first position of said tread molding means a tire molding cavity which is substantially cylindrical throughout an axial length which is generally equal to the axial width from bead to bead of a curable tire in the unshaped state thereof as built and which molding cavity is engageable in molding relation with the tread portion and at least substantially all of the sidewall portions of such tire received in said cavity.

26. Apparatus as claimed in claim 22, further comprising second bead engageable means for closing the other end of said cavity, and second locking means comprising interengageable means on said second bead engageable means and on said tread molding means movble into engagement during movement of said tread molding means toward said first position to prevent movement of said second bead engageable ceans out of closing relation with said other end of said cavity.

27. In apparatus as described in claim 26, means mounting the first mentioned bead engageable means for movement toward and away from said one end of said cavity including a first member extending coaxially thereof and supporting said first mentioned bead engageable means, and a second member disposed coaxially of said first member and supporting said second bead engageable means, said first and second members being disposed one within the other, and drive means for effecting relative coaxial movement between said first and second members to effect relative coaxial movement between said first mentioned and second bead engageable means.

References Cited

UNITED STATES PATENTS

| | | | |
|---|---|---|---|
| 1,101,732 | 6/1914 | Daughty | 18—17 |
| 1,388,255 | 8/1921 | Haideman | 18—17 |
| 2,921,337 | 1/1960 | Troblich et al. | 18—17 |
| 2,987,770 | 6/1961 | Powell | 18—18 |
| 2,959,815 | 11/1960 | Brundage | 18—17 |
| 3,184,794 | 5/1965 | Sherkin | 18—17 |
| 3,337,918 | 8/1967 | Pacciasini et al. | 18—17 |
| 3,396,221 | 8/1968 | Ballé et al. | 18—17 |
| 3,464,090 | 9/1969 | Cantarutti | 18—17 |

FOREIGN PATENTS

| | | |
|---|---|---|
| 975,644 | 11/1964 | Great Britain. |
| 1,096,189 | 12/1967 | Great Britain. |
| 1,440,604 | 4/1966 | France. |

J. HOWARD FLINT, JR., Primary Examiner